United States Patent
Bizon et al.

(10) Patent No.: US 12,476,393 B2
(45) Date of Patent: Nov. 18, 2025

(54) HYBRID ELECTRIC CHARGING INLET

(71) Applicant: Aptiv Technologies AG, Schaffhausen (CH)

(72) Inventors: Don E. Bizon, Boardman, OH (US); Thomas Mathews, Cortland, OH (US); Mark Fredrickson, Rootstown, OH (US); John Pechatsko, Kent, OH (US); Boris Borin, Pepper Pike, OH (US)

(73) Assignee: Aptiv Technologies AG, Schaffhausen (CH)

( * ) Notice: Subject to any disclaimer, the term of this patent is extended or adjusted under 35 U.S.C. 154(b) by 367 days.

(21) Appl. No.: 18/121,764

(22) Filed: Mar. 15, 2023

(65) Prior Publication Data

US 2023/0299512 A1    Sep. 21, 2023

Related U.S. Application Data

(60) Provisional application No. 63/321,387, filed on Mar. 18, 2022.

(51) Int. Cl.
*H01R 9/16*        (2006.01)
*B60L 53/16*       (2019.01)
(Continued)

(52) U.S. Cl.
CPC ............... *H01R 9/16* (2013.01); *B60L 53/16* (2019.02); *H01R 13/512* (2013.01); *H01R 43/20* (2013.01); *H02J 7/0045* (2013.01); *H01R 4/023* (2013.01); *H01R 4/308* (2013.01); *H01R 43/0207* (2013.01); *H01R 2201/26* (2013.01)

(58) Field of Classification Search
CPC ......... B60L 53/16; H01R 4/023; H01R 43/20; H01R 9/16; H02J 7/0045
See application file for complete search history.

(56) References Cited

U.S. PATENT DOCUMENTS 9,356,378 B1 *  5/2016  Glick ................... H01R 13/426
11,387,598 B2   7/2022  Durse et al.
(Continued)

FOREIGN PATENT DOCUMENTS

| EP | 3770005 A1 | 1/2021 |
| EP | 3842280 A1 | 6/2021 |
| WO | 2017162532 A1 | 9/2017 |

OTHER PUBLICATIONS

"Extended European Search Report", European Patent Office, mailed on Oct. 4, 2023, 7 Pages.
(Continued)

*Primary Examiner* — Abdullah A Riyami
*Assistant Examiner* — Thang H Nguyen
(74) *Attorney, Agent, or Firm* — Billion & Armitage

(57) ABSTRACT

An electrical connector assembly includes a connector housing defining a cavity and an opening providing access to the cavity, first and second direct current (DC) terminals disposed within the cavity, and first and second busbars electrically and mechanically attached directly to the first and second DC terminals respectively. The first and second busbars each have a rectangular cross section and wherein the first and second busbars extend through the opening such that portions of the first and second busbars are outside of the connector housing. A method of manufacturing an electrical connector assembly is also provided.

17 Claims, 8 Drawing Sheets

(51) Int. Cl.
H01R 13/512 (2006.01)
H01R 43/20 (2006.01)
H02J 7/00 (2006.01)
H01R 4/02 (2006.01)
H01R 4/30 (2006.01)
H01R 43/02 (2006.01)

(56) References Cited

U.S. PATENT DOCUMENTS

| | | | | |
|---|---|---|---|---|
| 11,495,908 | B2* | 11/2022 | Mathews | B60L 53/302 |
| 11,511,636 | B2 | 11/2022 | Mathews et al. | |
| 11,654,785 | B2* | 5/2023 | Genece | H02J 7/02 |
| | | | | 439/587 |
| 2014/0199867 | A1* | 7/2014 | Rogers | H01R 27/00 |
| | | | | 439/173 |
| 2018/0034171 | A1* | 2/2018 | Tyler | H01R 13/187 |
| 2018/0076534 | A1* | 3/2018 | Okamoto | H01R 11/12 |
| 2019/0074620 | A1* | 3/2019 | Moseke | B60L 53/16 |
| 2020/0266578 | A1 | 8/2020 | Durse et al. | |
| 2020/0313328 | A1 | 10/2020 | Mathews et al. | |
| 2021/0021077 | A1* | 1/2021 | Mathews | H01R 13/5202 |
| 2021/0394626 | A1* | 12/2021 | Genece | B60K 6/48 |
| 2022/0055490 | A1 | 2/2022 | Mathews et al. | |
| 2022/0234455 | A1* | 7/2022 | Fuehrer | B60L 53/302 |
| 2022/0247120 | A1 | 8/2022 | Durse et al. | |
| 2022/0250491 | A1* | 8/2022 | Fuehrer | H01R 13/5227 |
| 2022/0393372 | A1* | 12/2022 | Mathews | F28F 3/12 |
| 2024/0424925 | A1* | 12/2024 | Plasencia | H01R 13/04 |

OTHER PUBLICATIONS

Mathews, Thomas, APTIV; Passively Cooled Inlets: A Simple Solution to a Complex Challenge; 6 pages.

* cited by examiner

HYBRID ELECTRIC CHARGING INLET

CROSS-REFERENCE TO RELATED APPLICATION

This application claims benefit of priority to U.S. Provisional Patent Application No. 63/321,387 filed on Mar. 18, 2022, the entire disclosure of which is hereby incorporated by reference.

TECHNICAL FIELD

This disclosure is directed to a hybrid electric charging inlet, e.g., for charging batteries in electric vehicles, which includes busbars on the vehicle side of the inlet to conduct electrical power and provide cooling for terminals in the charging inlet. As used herein, hybrid means that the charging inlet can accept either alternating current or direct current electrical power.

BACKGROUND

Consumers demand quickly charging their electric vehicles so they can spend less time waiting and more time driving. Reducing charge times is a tremendous challenge, in no small part due to one key factor: heat. The more electric current there is going through a conductor, the hotter the conductor will get. There are regulations that limit the allowable temperature at the terminal contact interface. Actively cooled charging inlets having liquid-cooling systems are currently the most effective for limiting terminal contact interface temperature, but they add cost and complexity. Passively cooled systems are an alternative; they also reduce terminal contact interface temperatures, although not as effectively as active-cooled systems.

An active-cooling system uses a cold plate near the high-voltage terminals, with coolant lines running from the cold plate to a heat exchanger. Usually, the coolant supply from either the vehicle's power-electronics coolant loop or the battery pack coolant loop is used to supply coolant to the cold plate. There are certain drawbacks to using an active-cooled system. An obvious one is coolant routing and management. The coolant tubes between the cold plate and the heat exchanger must be carefully routed through the vehicle, adding a level of complexity to the assembly process. These active-cooling systems can also experience failures due to coolant leakage, corrosion, or circulation issues.

In addition, measures must be taken to ensure that the coolant temperature is low enough to maintain limiting terminal contact interface temperature, typically below 90° C., to protect anyone who might touch the terminal contacts. Depending on the heat exchanger used, the normal operating temperature of the coolant may be as high as 70° C., which is near the 90° C. limit. To provide a robust system, vehicle manufacturers may increase capacity of the heat exchanger, at the expense of vehicle manufacturing cost and complicating the packaging of the larger heat exchanger in the vehicle.

Passive-cooling systems may use special materials and component shapes to dissipate heat without using moving parts. For example, a fined aluminum heat sink could be attached to a cooling plate. The fins increase the surface area of the heat sink, allowing the air around the heat sink to absorb and remove heat from the heat sink via conduction and convection.

Passive-cooling systems may use so-called potting material, a polyurethane- or epoxy-based thermally conductive material, around the power terminals to draw away heat. They may alternatively or additionally use conductive plastics, or even "phase change" material, which has a high latent heat capacity and absorbs heat as the phase change material transitions from one physical state to another, e.g., from a solid to a liquid.

However, these passive-cooling systems have limitations. For instance, the potting material tends to stay hot after charging. After it absorbs the heat, the heat must be dissipated through the case of the charging inlet via conduction which it is not particularly efficient. Additionally, if there is a problem with the charging inlet that requires replacement, the potting material causes the entire wiring harness attached to the charging inlet to also be replaced. Further, conductive plastics add significant cost to the charging inlet without significantly lowering temperatures on their own.

The Combined Charging Systems (CCS1 and CCS2) are standards for electrical connectors used for charging electric vehicles. It uses alternating current (AC) and fast charging direct current (DC) connectors to provide electrical power to the electric vehicle at power levels up to 350 kilowatts. These CCS systems have a power outlet connector that is attached to the charging station and a power inlet connector that is integrated with the electric vehicle. Prior CCS power inlet connectors were generally very cumbersome and difficult to build and assemble. They usually involve processing many wire leads, thus causing complexity in manufacturing assembly processes.

Therefore, a high-power electrical connector assembly that can provide a maximum power level for a greater period and is easy to build and assemble remains desired.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

According to one or more aspects of the present disclosure, an electrical connector assembly includes a connector housing defining a cavity and an opening providing access to the cavity; first and second direct current (DC) terminals disposed within the cavity; and first and second busbars electrically and mechanically attached directly to the first and second DC terminals respectively, wherein the first and second busbars each have a rectangular cross section and wherein the first and second busbars extend through the opening such that portions of the first and second busbars are outside of the connector housing.

In some aspects of the electrical connector assembly according to the previous paragraph, the first and second busbars are also attached to first and second wire cables, respectively.

In some aspects of the electrical connector assembly according to any one of the previous paragraphs, the first and second busbars are ultrasonically welded to the first and second wire cables, respectively.

In some aspects of the electrical connector assembly according to any one of the previous paragraphs, the first and second wire cables each have a generally round cross section.

In some aspects of the electrical connector assembly according to any one of the previous paragraphs, each of the first and second busbars has an attachment end attached to the first and second DC terminals, respectively, and has a connection end connected to the first and second wire cables, respectively.

In some aspects of the electrical connector assembly according to any one of the previous paragraphs, the attachment ends are arranged substantially parallel to the connection ends.

In some aspects of the electrical connector assembly according to any one of the previous paragraphs, the attachment ends are arranged substantially perpendicular to the connection ends.

In some aspects of the electrical connector assembly according to any one of the previous paragraphs, the first and second busbars each defines a reverse curve between the attachment ends and connection ends and wherein one of the curves of the reverse curve has curvature that is more than 90 degrees.

In some aspects of the electrical connector assembly according to any one of the previous paragraphs, the first and second busbars each have a cross-sectional area of at least 200 square millimeters.

In some aspects of the electrical connector assembly according to any one of the previous paragraphs, the electrical connector assembly is a charging inlet of an electric vehicle charging system.

In some aspects of the electrical connector assembly according to any one of the previous paragraphs, the electrical connector assembly includes a modular faceplate selected from a number of different faceplates configured to be used with the electrical connector assembly.

In some aspects of the electrical connector assembly according to any one of the previous paragraphs, the modular faceplate includes lighting features.

In some aspects of the electrical connector assembly according to any one of the previous paragraphs, the modular faceplate is configured to communicate with an electronic controller in the electrical connector assembly via a digital communication bus.

In some aspects of the electrical connector assembly according to any one of the previous paragraphs, the digital communication bus is selected from a list consisting of a controller area network (CAN) bus and a local interconnect network (LIN) bus.

According to one or more aspects of the present disclosure, a method of manufacturing an electrical connector assembly includes the steps of:
  disposing first and second direct current (DC) terminals within a cavity of a connector housing;
  inserting first and second busbars through an opening in the connector housing providing access to the cavity;
  arranging the first and second busbars to extend through the opening such that portions of the first and second busbars are outside of the connector housing, wherein the first and second busbars each have a rectangular cross section; and
  electrically and mechanically attaching the first and second busbars directly to the first and second DC terminals respectively.

In some aspects of the method according to the previous paragraph, the method further includes attaching the first and second busbars to first and second wire cables, respectively.

In some aspects of the method according to any one of the previous paragraphs, the first and second busbars are ultrasonically welded to the first and second wire cables, respectively.

In some aspects of the method according to any one of the previous paragraphs, each of the first and second busbars has an attachment end attached to the first and second DC terminals respectively and has a connection end connected to the first and second wire cables, respectively, and wherein the attachment ends are arranged substantially parallel to the connection ends or are arranged substantially perpendicular to the connection ends.

In some aspects of the method according to any one of the previous paragraphs, the method further includes attaching a modular faceplate selected from a number of different faceplates to the electrical connector assembly.

In some aspects of the method according to any one of the previous paragraphs, the method further includes attaching the electrical connector assembly to an electric vehicle to provide a charging inlet for an electric vehicle charging system.

BRIEF DESCRIPTION OF THE DRAWINGS

The present invention will now be described by way of example with reference to the accompanying drawings, in which.

Figure 1:
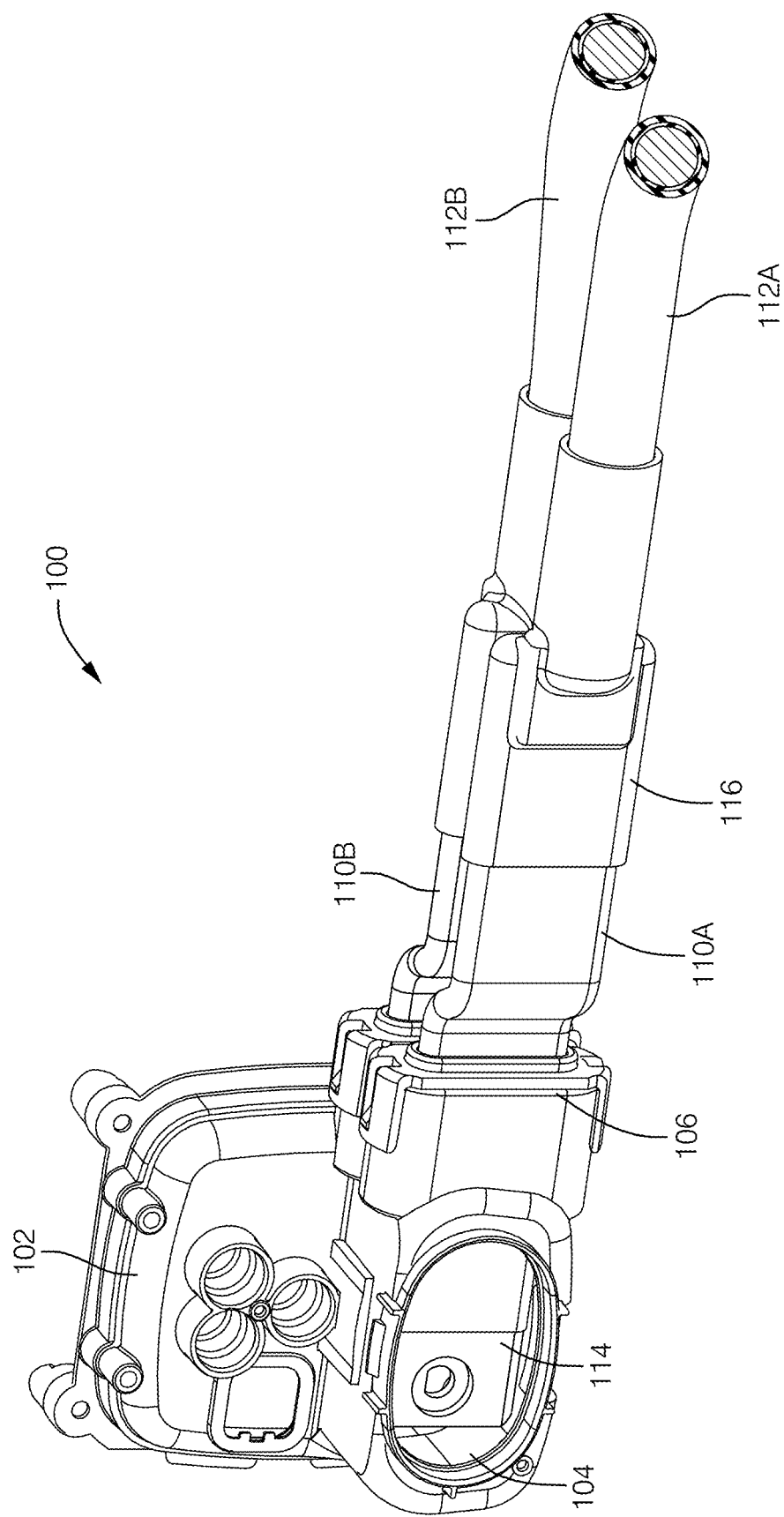
FIG. 1 shows a rear isometric view of a charging inlet having right dress busbars according to some embodiments.
Figure 2:
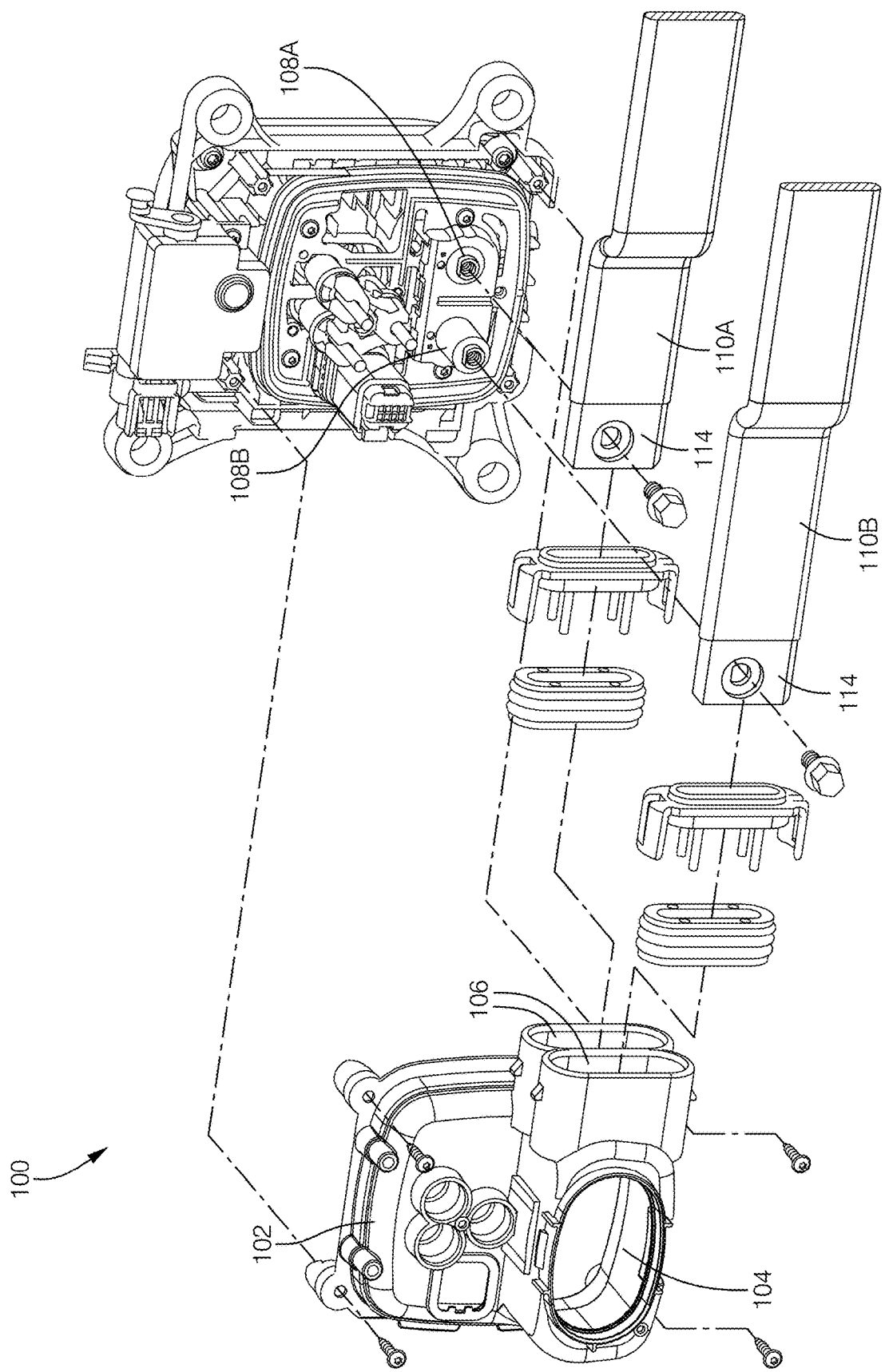
FIG. 2 shows an exploded view of the charging inlet of FIG. 1 according to some embodiments.

Reference numbers for similar features in the various figures share the last two digits.

DETAILED DESCRIPTION

The inventors have found that a very good solution for passively cooling a charging inlet is the use of busbars having a rectangular cross section in place of wire cables having a round cross section for the electrical connection to the DC terminals of the charging inlet. Because the rectangular busbars have a higher surface area per volume than round cables, they provide an improved heat sink for the DC terminals, thereby distributing the heat across a larger surface area so that it dissipates more efficiently into the air around the busbars via convection.

Furthermore, rectangular busbars are not required for the full length of the connection between the charging inlet and the battery pack to provide this benefit. Busbars extending from the charging inlet can connect to round cables for the remainder of the distance to the battery. This is a benefit since packaging a wire cable that is at least semi-flexible in a vehicle is easier than packaging a generally rigid busbar along the entire length of the connection between the charging inlet and the battery pack. Not only are the metal bars capable of carrying the required current, but their rigid structure also makes the assembly of the charging inlet more easily automatable. For these reasons, busbars are desirable for connection to the DC terminals of the charging inlet and meeting temperature requirements for the DC terminals therein.

FIGS. 1 to 4 illustrate three non-limiting examples of electrical connector assemblies, particularly these examples are electric vehicle charging inlets 100, 200, 300. Inlet 100 includes a connector housing 102 defining a cavity 104 and an opening 106 providing access to the cavity 104, first and second direct current (DC) terminals 108A, 108B (see FIG. 2) disposed within the cavity 104, and first and second busbars 110A, 110B that are electrically and mechanically attached directly to the first and second DC terminals 108A, 108B respectively. The first and second busbars 110A, 110B are preferably formed of copper or a copper-based material due to copper's superior electrical and thermal conductivity, each of the first and second busbars 110A, 110B have a rectangular cross section. The first and second busbars 110A, 110B may alternatively be constructed of an aluminum-based material or any other material having sufficient electrical and thermal conductivity. The first and second busbars 110A, 110B extend through the opening 106 so that that portions of the first and second busbars 110A, 110B are located outside of the connector housing 102. The first and second busbars 110A, 110B are also attached, preferably ultrasonically welded, to first and second wire cables 112A. 112B, respectively. The first and second busbars 110A, 110B have a rectangular cross section, preferably with a cross-sectional area of at least 200 square millimeters. The first and second wire cables each have a generally round cross section, preferably with a cross-sectional area of at least 95 square millimeters.

Each of the first and second busbars 110A, 110B has an attachment end 114 that is attached to the first and second DC terminals 108A, 108B respectively, for example by a threaded fastener extending through a hole in one of the busbars 11A. 110B and received within a treaded hole in one of the DC terminals 108A, 108B. Each of first and second busbars 110A, 110B has a connection end 116 that is connected to the first and second wire cables 112A, 112B, respectively.

Figure 3:
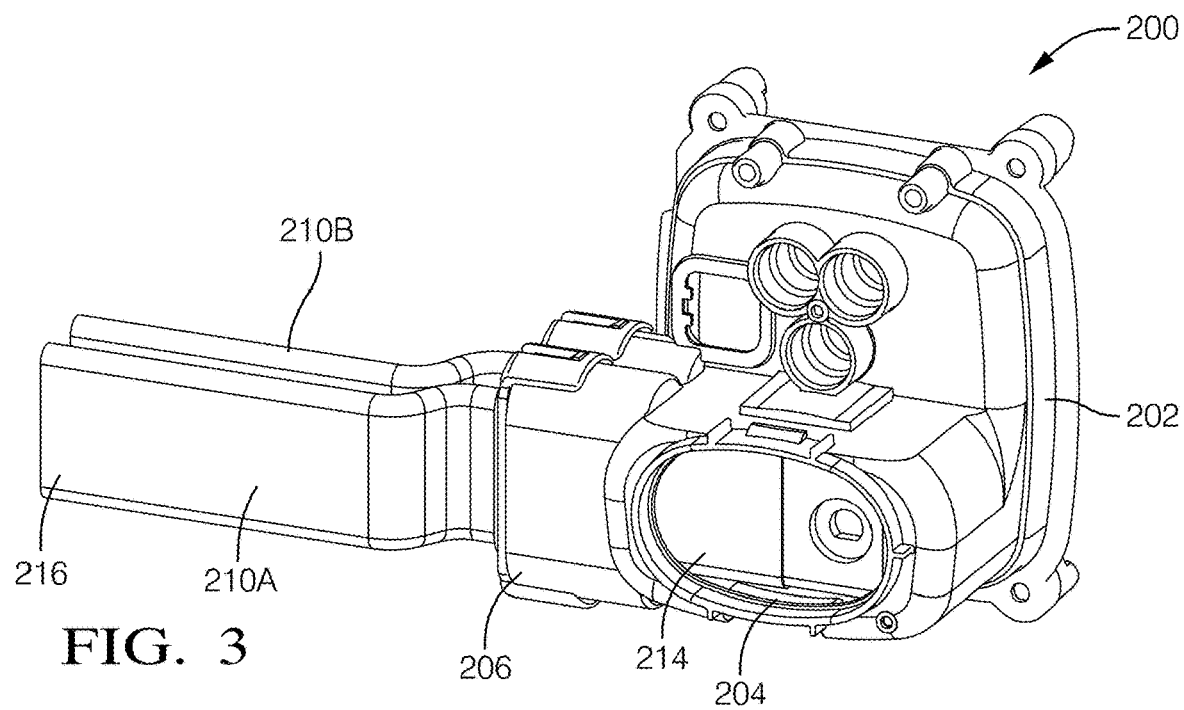
FIG. 3 shows a rear isometric view of a charging inlet having downward dress busbars according to some embodiments.

FIG. 3 shows an inlet 200 which includes a connector housing 202 defining a cavity 204 and an opening 206 providing access to the cavity 204, first and second direct current (DC) terminals disposed within the cavity 204, and first and second busbars 210A, 210B that are electrically and mechanically attached directly to the first and second DC terminals respectively. The first and second busbars 210A, 210B are preferably formed of copper or a copper-based material due to copper's superior electrical and thermal conductivity, each of the first and second busbars 210A, 210B have a rectangular cross section. The first and second busbars 210A, 210B may alternatively be constructed of an aluminum-based material or any other material having sufficient electrical and thermal conductivity. The first and second busbars 210A, 210B extend through the opening 206 so that that portions of the first and second busbars 210A, 210B are located outside of the connector housing 202. The first and second busbars 210A, 210B are also attached, preferably ultrasonically welded, to first and second wire cables respectively. The first and second busbars 210A. 210B have a rectangular cross section, preferably with a cross-sectional area of at least 200 square millimeters. The first and second wire cables each have a generally round cross section, preferably with a cross-sectional area of at least 95 square millimeters.

Figure 4:
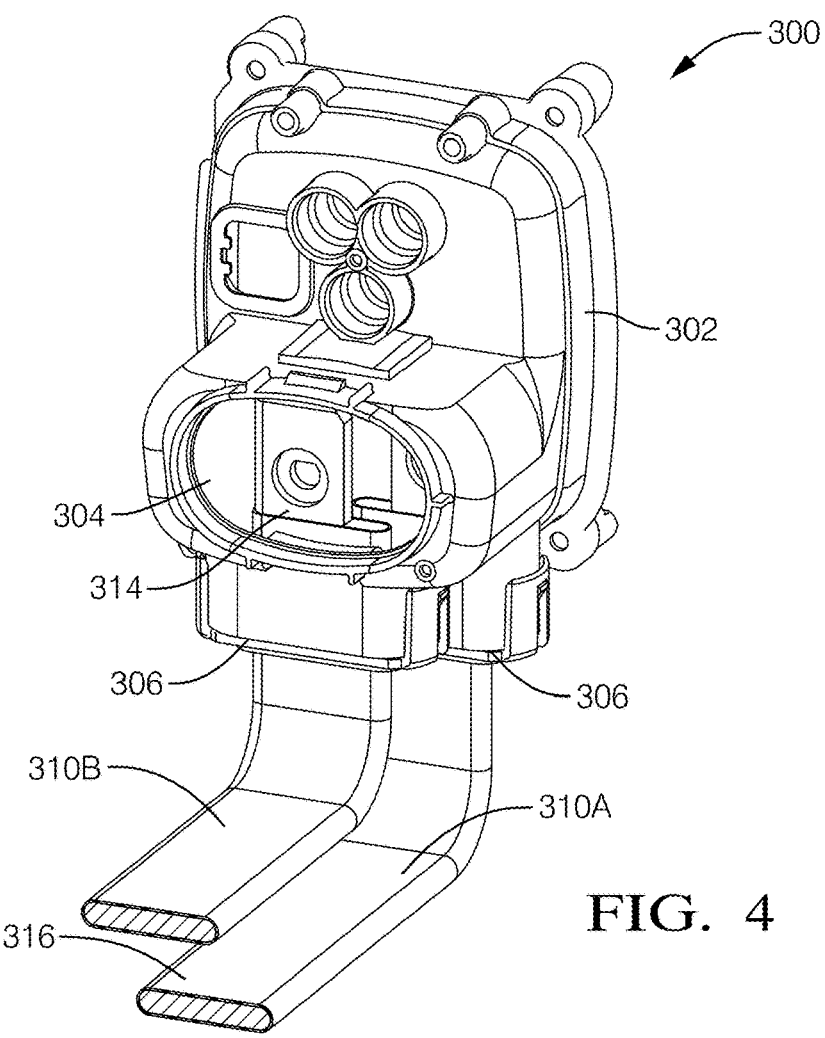
FIG. 4 shows a rear isometric view of a charging inlet having left dress busbars according to some embodiments.

FIG. 4 shows an inlet 300 which includes a connector housing 302 defining a cavity 304 and an opening 306 providing access to the cavity 304, first and second direct current (DC) terminals disposed within the cavity 304, and first and second busbars 310A, 310B that are electrically and mechanically attached directly to the first and second DC terminals respectively. The first and second busbars 310A, 310B are preferably formed of copper or a copper-based material due to copper's superior electrical and thermal conductivity, each of the first and second busbars 310A, 210B have a rectangular cross section. The first and second busbars 310A, 310B may alternatively be constructed of an aluminum-based material or any other material having sufficient electrical and thermal conductivity. The first and second busbars 310A, 310B extend through the opening 306 so that that portions of the first and second busbars 310A, 310B are located outside of the connector housing 202. The first and second busbars 310A, 310B are also attached, preferably ultrasonically welded, to first and second wire cables respectively. The first and second busbars 310A. 310B have a rectangular cross section, preferably with a cross-sectional area of at least 200 square millimeters. The first and second wire cables each have a generally round cross section, preferably with a cross-sectional area of at least 95 square millimeters.

As shown in Returning to FIGS. 1 and 2, the attachment ends 114, 214 may be arranged substantially perpendicular to the connection ends 116, 216 in a right dress configuration shown in FIGS. 1 and 2 or a left dress configuration shown in FIG. 3. The attachment ends 114, 214 may be offset from the connection ends 116, 216. As used herein, substantially perpendicular means±10° of absolutely perpendicular. As shown in FIG. 4, the attachment ends 314 may be arranged substantially parallel to the connection ends 316 in a downward dress configuration. As used herein, substantially parallel means±10° of absolutely parallel. Alternative embodiments may be envisioned in which the attachment ends may be arranged non-parallel and non-perpendicular to the connection ends.

Figure 5:
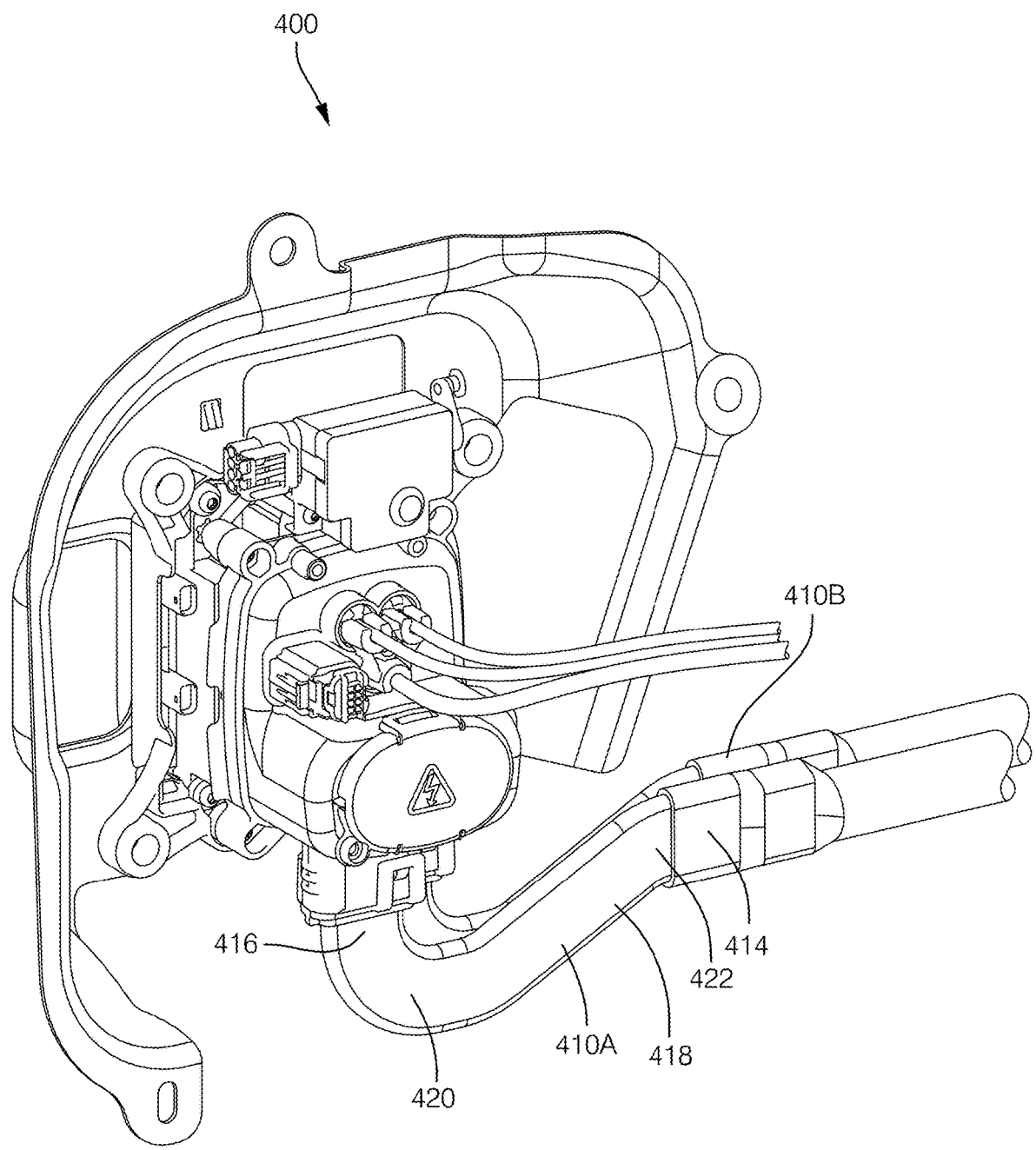
FIG. 5 shows a rear isometric view of another charging inlet having right dress busbars according to some embodiments.

FIG. 5 shows an alternative inlet 400 that conforms with the description of inlet 200 above and having the attachment ends 414 arranged substantially perpendicular to the connection ends 416 in a right dress configuration. In addition to the features on inlet 200, the first and second busbars 410A. 410B of inlet 400 each defines a reverse curve 418 between the attachment ends 414 and connection ends 416. One of the curves 420 of the reverse curve 418 has curvature that is more than 90 degrees and the other curve 422 is less than 90 degrees.

Figure 6:
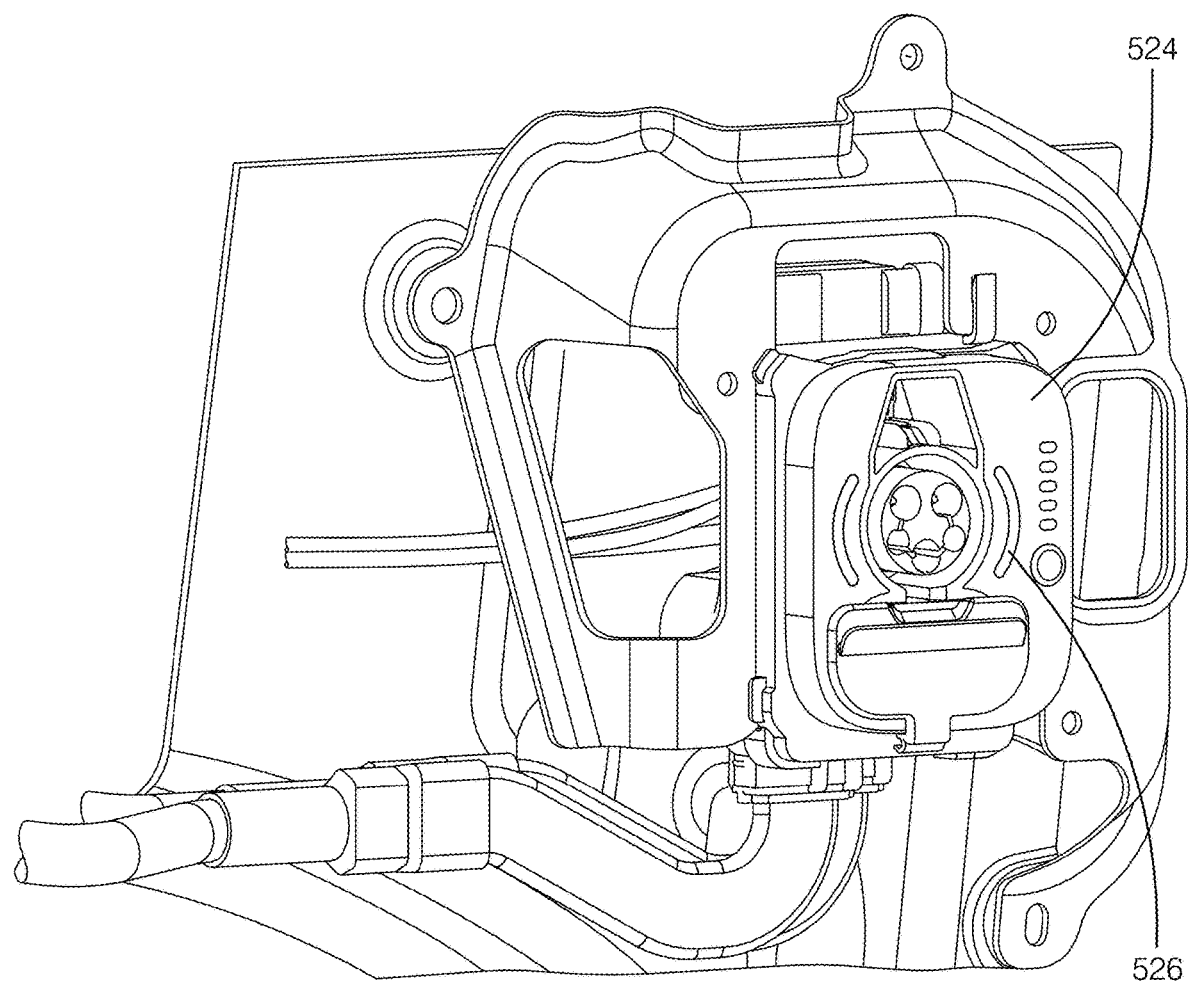
FIG. 6 shows a front isometric view of the charging inlet of FIG. 5 according to some embodiments.

As shown in FIG. 6, the inlets 100, 200, 300, 400 may further include a modular faceplate 524 that may be selected from a number of different faceplates. The modular faceplate 524 includes lighting features 526. The modular faceplate is configured to communicate with an electronic controller in the inlet via a digital communication bus, such as a controller area network (CAN) bus and/or a local interconnect network (LIN) bus.

The modular faceplate 524 allows having pluggable Combined Charging System 1 (CCS1) charging inlets primarily used with North American vehicles and Combined Charging System 2 (CCS2) charging inlets primarily used with European vehicles based on common inlets 100, 200, 300, 400, thereby reducing the number of loose piece components handled by the harness manufacturer. This enhances manufacturing error proofing and assembly efficiency.

Figure 7:
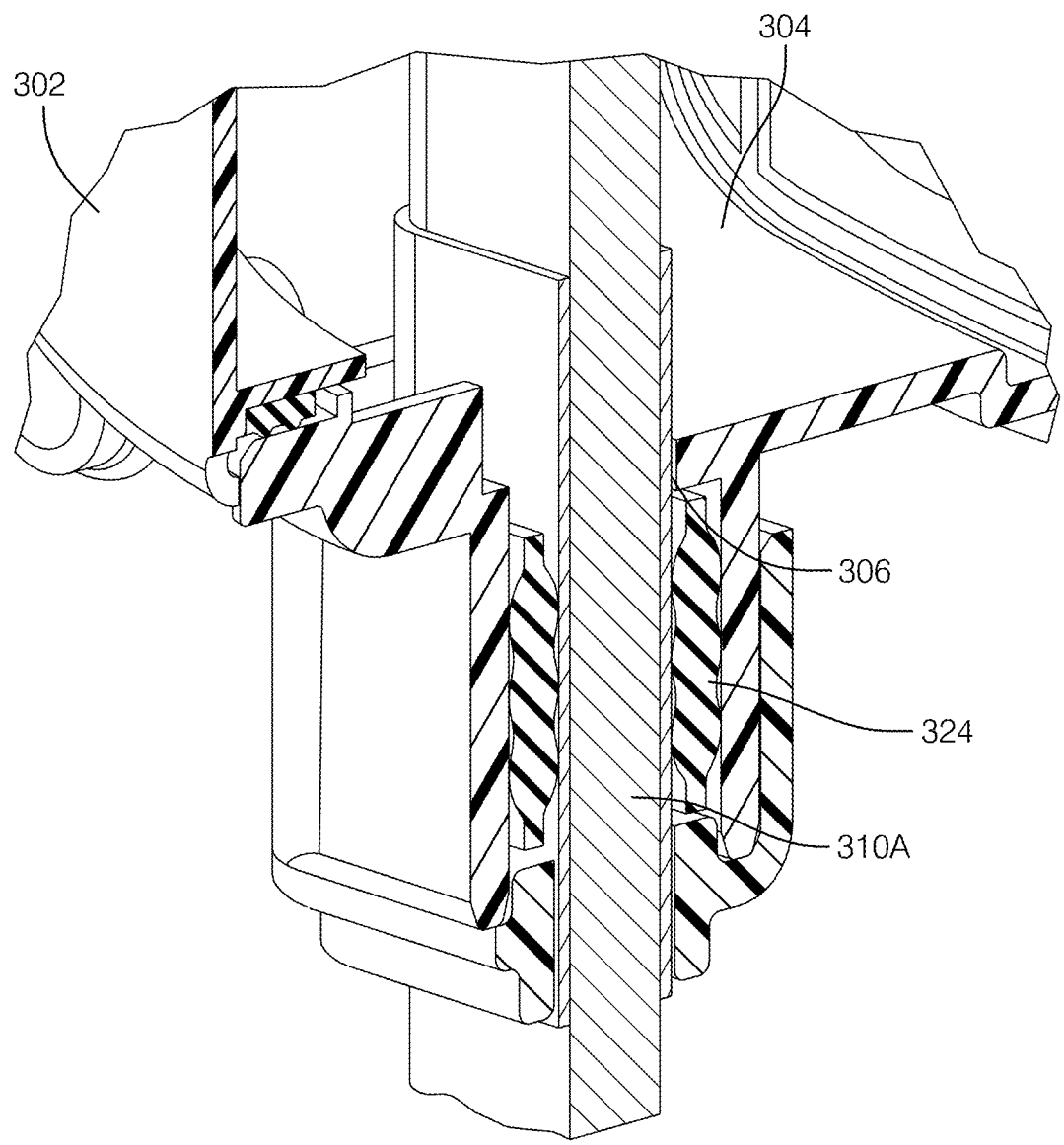
FIG. 7 shows a close-up cross section view of a busbar seal according to some embodiments.

FIG. 7 illustrates a busbar seal 324 of inlet 300 that is formed of a compliant material, e.g., a silicone-based material, which surrounds each of the busbars to inhibit the entry of environmental contaminants, such as water and dust, into the cavity 304. Each of the other inlets 100, 200, 400 may also include identical or similar busbar seals.

The hybrid busbar charging inlet 100, 200, 300, 400 also enables a replaceable/serviceable solution in the field without the need to replace entire harnesses.

Figure 8:
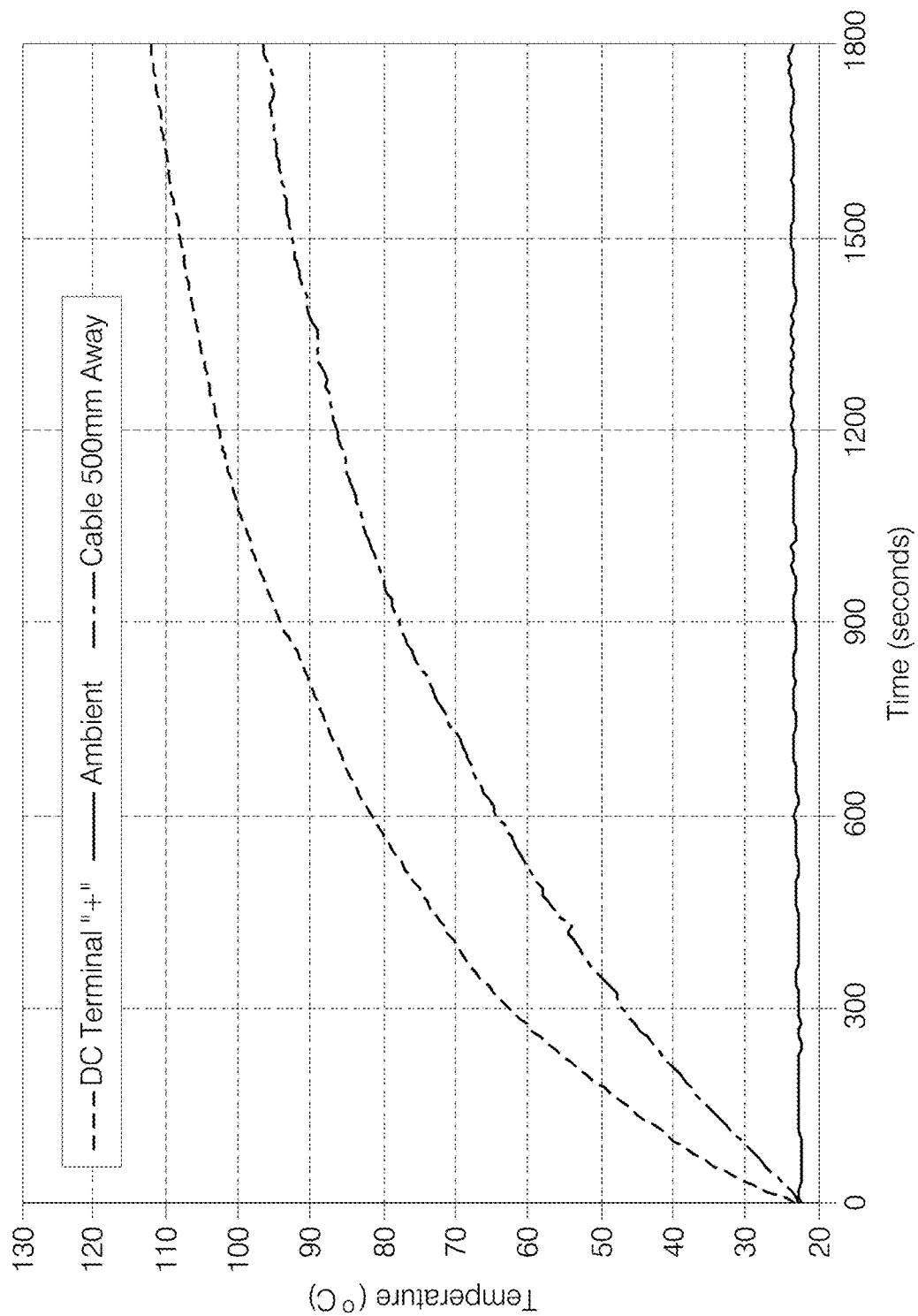
FIG. 8 shows temperature rise graph of a positive DC terminal of a charging inlet and a cable connected thereto according to the prior art.
Figure 9:
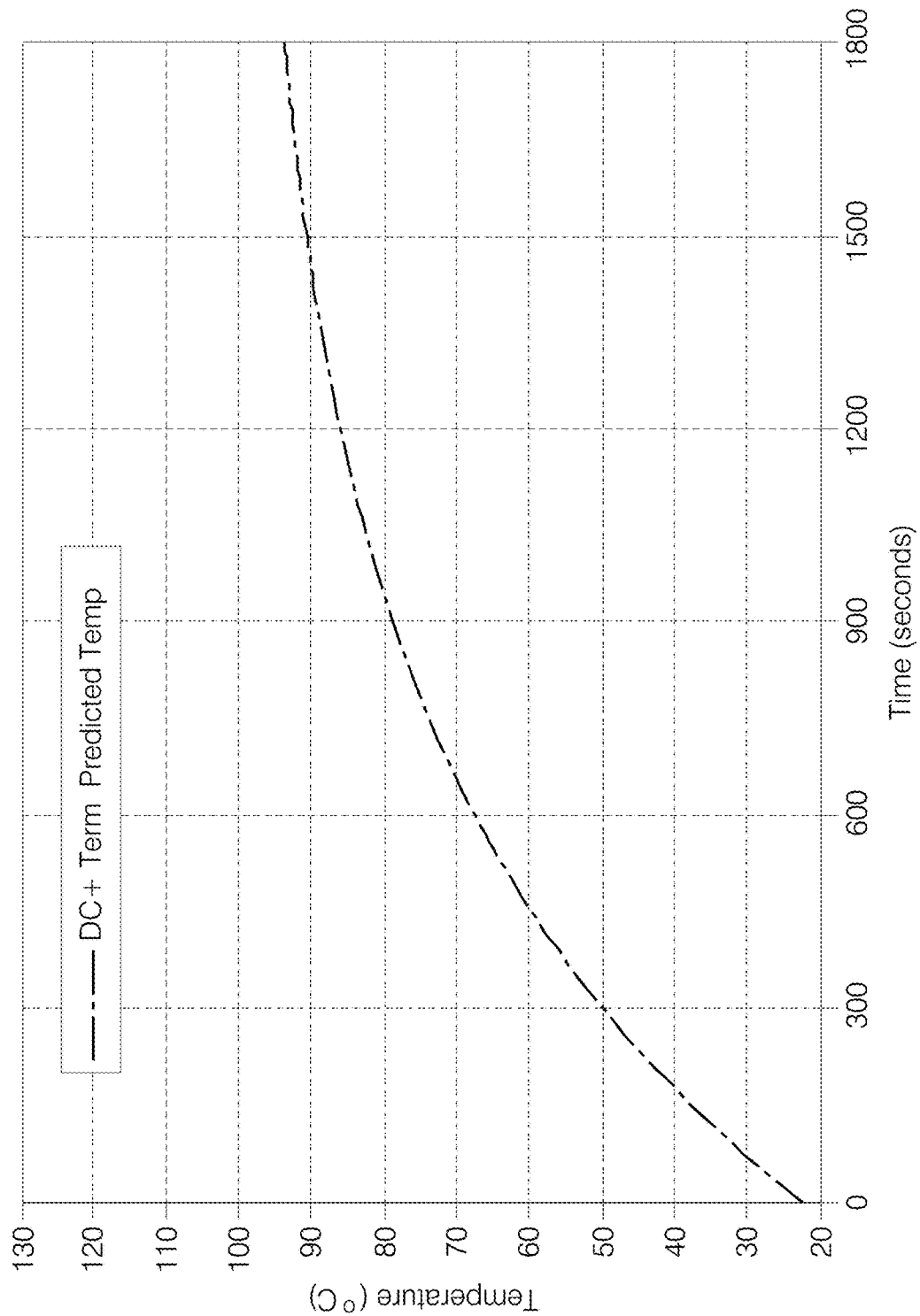
FIG. 9 shows a predicted temperature rise graph of a positive DC terminal of a charging inlet according to some embodiments.

As shown in FIGS. 8 and 9, using rectangular busbars instead of round cables can significantly extend the time in which an inlet can receive a fast charge before reaching the 90° C. temperature threshold at the DC terminal established by the automotive manufacturers. A comparison of the positive DC terminal temperature in an inlet connected to a round 95 mm$^2$ cable in FIG. 8 may be made with the positive DC terminal temperature in an inlet connected to rectangular 200 mm$^2$ busbars shown in FIG. 9. In each of these graphs, the inlet is connected to the same electric vehicle charger operating at 500A. This comparison of FIGS. 8 and 9 shows that an inlet using busbars can conduct 500A for about 2.5 times longer before the positive DC terminals reaches a temperature of 90° C.

The busbars also provide serviceability. If the inlet needs to be fixed or replaced, a service technician can simply detach it from the busbars instead of replacing the entire wiring harness.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:
   a connector housing defining a cavity and an opening providing access to the cavity;
   first and second direct current (DC) terminals disposed within the cavity; and
   first and second busbars electrically and mechanically attached directly to the first and second DC terminals respectively within the cavity, wherein the first and second busbars each have a rectangular cross section, the first and second busbars extending from the cavity and through the opening such that portions of the first and second busbars are disposed outside of the connector housing, each of the first and second busbars having an attachment end attached to the first and second DC terminals, respectively, the first and second busbars each further having a connection end distinct from the attachment end connected directly connected to first and second wire cables, respectively.

2. The electrical connector assembly according to claim 1, wherein the first and second busbars are ultrasonically welded to the first and second wire cables, respectively.

3. The electrical connector assembly according to claim 1 wherein the first and second wire cables each have a generally round cross section.

4. The electrical connector assembly according to claim 1, wherein the attachment ends are arranged substantially parallel to the connection ends.

5. The electrical connector assembly according to claim 1, wherein the attachment ends are arranged substantially perpendicular to the connection ends.

6. The electrical connector assembly according to claim 1, wherein the first and second busbars each define a reverse curve between the attachment ends and connection ends and wherein one of the curves of the reverse curve has curvature that is more than 90 degrees.

7. The electrical connector assembly according to claim 1, wherein the first and second busbars each have a cross-sectional area of at least 200 square millimeters.

8. The electrical connector assembly according to claim 1, wherein the electrical connector assembly is a charging inlet of an electric vehicle charging system.

9. The electrical connector assembly according to claim 1, wherein the electrical connector assembly further comprises a modular faceplate selected from a number of different faceplates configured to be used with the electrical connector assembly.

10. The electrical connector assembly according to claim 9, wherein the modular faceplate includes lighting features.

11. An electrical connector assembly, comprising:
   a connector housing defining a cavity and an opening providing access to the cavity:
   first and second direct current (DC) terminals disposed within the cavity;
   first and second busbars electrically and mechanically attached directly to the first and second DC terminals respectively, the first and second busbars each having a rectangular cross section and the first and second busbars extending through the opening such that portions of the first and second busbars are outside of the connector housing; and
   a modular faceplate configured to communicate with an electronic controller in the electrical connector assembly via a digital communication bus.

12. The electrical connector assembly according to claim 11, wherein the digital communication bus is selected from a list consisting of a controller area network (CAN) bus and a local interconnect network (LIN) bus.

13. A method of manufacturing an electrical connector assembly, comprising:
   disposing first and second direct current (DC) terminals within a cavity of a connector housing;
   attaching first and second wire cables to connection ends of first and second busbars, respectively;
   inserting the first and second busbars through an opening in the connector housing providing access to the cavity and arranging the first and second busbars to extend from the cavity through the opening such that portions of the first and second busbars are disposed outside of the connector housing, wherein the first and second busbars each have a rectangular cross section; and
   electrically and mechanically attaching attachment ends of the first and second busbars which are distinct from the connection ends directly to the first and second DC terminals respectively, the attachment of the attachment ends of the first and second busbars to the first and second DC terminals being made within the cavity.

14. The method according to claim 13, wherein the first and second busbars are ultrasonically welded to the first and second wire cables, respectively.

15. The method according to claim 13, wherein the attachment ends are arranged substantially parallel to the connection ends or are arranged substantially perpendicular to the connection ends.

16. The method according to claim 13, further comprising attaching a modular faceplate selected from a number of different faceplates to the electrical connector assembly.

17. The method according to claim 13, further comprising attaching the electrical connector assembly to an electric vehicle.

* * * * *